United States Patent
Koyama (10) Patent No.: US 7,499,640 B2
(45) Date of Patent: Mar. 3, 2009

(54) IMAGE-RECORDING APPARATUS

(75) Inventor: Kenji Koyama, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 647 days.

(21) Appl. No.: 11/176,191

(22) Filed: Jul. 8, 2005

(65) Prior Publication Data

US 2006/0006844 A1   Jan. 12, 2006

(30) Foreign Application Priority Data

Jul. 9, 2004   (JP)   ............................. 2004-202812

(51) Int. Cl.
G03B 17/18 (2006.01)
G03B 17/20 (2006.01)
G03B 7/26 (2006.01)
G03B 13/02 (2006.01)
H04N 5/222 (2006.01)
H04N 5/225 (2006.01)

(52) U.S. Cl. ........................ 396/201; 396/296; 396/301; 396/303; 396/373; 348/333.01; 348/341; 323/371

(58) Field of Classification Search ................... 396/57, 396/88, 96, 264, 277, 286, 287, 300, 349, 396/301, 529, 373, 201, 296, 303; 348/333.01, 348/341; 323/371
See application file for complete search history.

(56) References Cited

U.S. PATENT DOCUMENTS

| 5,381,207 A * | 1/1995 | Kazumi ........................ 396/57 |
| 6,041,189 A * | 3/2000 | Izukawa ...................... 396/277 |
| 6,377,753 B1 * | 4/2002 | Matsumoto ................... 396/96 |
| 6,856,765 B2 * | 2/2005 | Okubo ........................ 396/88 |

FOREIGN PATENT DOCUMENTS

JP   3203188   6/2001

* cited by examiner

*Primary Examiner*—Melissa J Koval
(74) *Attorney, Agent, or Firm*—Oblon, Spivak, McClelland, Maier & Neustadt, P.C.

(57) ABSTRACT

An image-recording apparatus includes a display unit for displaying an image photographed by an sensing device, an illuminating unit for emitting light by discharging charges charged in a capacitor on photographing, a power source unit in which any one of plural kinds of power sources is selectively usable, and a power source detector to detect which kind of the power source is being used in the power source unit. Displaying on the display unit and charging of the capacitor are performed by using the power source in the power source unit. When the power source detector detects that the power source unit uses a specified kind of the power source, the display unit is operated even during charging the capacitor, whereas when the power source detector detects that the power source other than said specified one is being used in the power source detector unit, the display unit is set in no operation during charging the capacitor.

16 Claims, 11 Drawing Sheets

IMAGE-RECORDING APPARATUS

INCORPORATION BY REFERENCE CROSS REFERENCE TO RELATED APPLICATION

This application is based on Japanese patent application No. 2004-202812 filed on Jul. 9, 2004, the contents of which are incorporated herein by reference.

BACKGROUND OF THE INVENTION

Field of the Invention

The present invention relates to an image-recording apparatus. More specifically, the invention relates to an image-recording apparatus, such as a digital still camera, which apparatus enhances usability (convenience, availability) and prolongs the life span of batteries by controlling displaying with a display unit such as an LCD monitor during charging a flash depending upon kinds of power sources.

In the image-recording apparatus such as the digital still camera, a LCD (Liquid Crystal Display) monitor is provided as an image-displaying unit to be used for making a user to immediately confirm a photographed image and also as a finder to determine a composition by displaying an object to be photographed. Since consumption current is considerably large when the LCD monitor is being turned on, this is a big factor to determine the life span of the battery.

In the conventional silver salt film camera, a charging current during charging the flash and a current for a motor during rolling up a film or driving lenses are recited as such big factors for determining the span life of the battery. Since consumption current in a circuit in a waiting state (photographing-waiting state) is suppressed to a low level, such will not pose a great problem.

Since the LCD monitor also functions as the finder as mentioned above in the case of the digital still camera having the LCD monitor, a considerable amount of the consumption current flows in the waiting state. Thus, this shortens the life span of the battery.

In the case of the silver salt film camera equipped with the flash, the consumption current during charging the flash is the largest among those for operations of the camera. Thus, the voltage of the battery largely drops owing to an internal resistance of the battery caused by the current for charging the flash.

Under the circumstances, the silver salt film camera having the flash is constituted such that sufficient voltage is ensured for a power source of a control circuit by means of a voltage-elevating circuit, a backup circuit or the like so that the control circuit may correctly operate even if the voltage of the battery largely drops during charging the flash. Further, other operations (for example, operations such as driving a motor) requiring a considerable amount of consumption current are not simultaneously performed during charging the flash.

Even in the digital still camera having the LCD monitor, the life span of the battery can be prolonged when the LCD monitor is not operated during charging the flash. However, as the conventional digital still camera, there are a type in which an LCD monitor is turned on even during charging the flash by using a battery having a relatively high electromotive force like a lithium ion battery and a type in which a LCD monitor is turned off during charging the flash by using a battery having a relatively low electromotive force like a size AA battery.

However, as mentioned above, the LCD monitor functions as a finder in the digital still camera having the LCD monitor. Thus, if the LCD monitor is turned off during charging the battery, a next composition to be photographed cannot be determined by using the LCD monitor during charging the flash. This deteriorates availability.

In this connection, there is proposed an electronic still camera in which if the remaining battery power decreased from a predetermined value, a monitor is operated only for a confirmation-enabling time period in which a user can confirm data of an image to be photographed in the state that the flash capacitor is prohibited from being charged, then the monitor is placed under no operation, and the capacitor is charged. Patent Literature 1 JP U.S. Pat. No. 3,203,188

In the above prior art, improvement is required to prolong the life span of the battery while improving the usability by providing the usage pattern corresponding to the battery in use.

That is, if display is made in the LCD monitor even during charging the flash as in the conventional digital still camera irrespective of the kind of the battery in use, the life span of the battery is short when the battery is a size AA battery. Consequently, the battery must be frequently exchanged, and the usability is poor. In addition, if the LCD monitor is turned off irrespective of the kind of the battery in use, a next composition to be photographed can not be determined during charging the flash, although the life span of the battery can be prolonged to increase the number of images to be photographed. Thus, the usability is also poor.

In the prior art described in the Patent Literature 1, the LCD monitor is turned on even during charging the battery when the remaining battery power is sufficient, whereas if it becomes insufficient, the LCD monitor is turned off during charging the flash. Therefore, if the remaining battery power becomes insufficient during use of the flash, the LCD monitor is rapidly turned off at the point of time during charging the flash. The user may think by mistake that a trouble occurred. In addition, since a display mode is changed in the LCD monitor as an actual problem at an unpredictable time, which forcedly and rapidly cause inconvenience during use of the camera.

SUMMARY OF THE INVENTION

Under the circumstances, the present invention is aimed at providing an availability-excellent image-recording apparatus which increases the number of images to be photographed per battery source by controlling operation of a display during charging a capacitor for an illuminating unit depending upon one in use of plural kinds of usable power sources, for example depending on difference in electromotive forces between the power sources.

In order to accomplish the above object, the image-recording apparatus according to the present invention comprises a display unit for displaying an image photographed by an sensing device and subjected to a predetermined signal processing, an illuminating unit for emitting light by discharging charges charged in a capacitor on photographing, a power source unit in which any one of plural kinds of power sources is selectively usable, and a power source detector to detect which kind of the power source is being used in the power source unit among said plural kinds of the usable power sources, wherein displaying on the display unit and charging of the capacitor are performed by using the power source in the power source unit; when the power source detector detects that the power source unit uses a specified kind of the power source, the display unit is operated even during charging the capacitor, whereas when the power source detector detects that the power source other than said specified one is being used in the power source detector unit, the display unit is set in no operation during charging the capacitor.

The present invention is aimed at providing the usability-excellent image-recording apparatus in which the operation of the display unit which performs displaying of an image, etc. during charging the capacitor to accumulate the charges for making the illuminating unit emit light is controlled based on whether the kind of the power source used in the power source unit where the plural kinds of the power sources are selectively usable is the specified power source (for example, the power source having a relatively high electromotive force) or not, so that inadvertent switching between the displaying and the non-displaying in the display unit can be prevented, and the number of images to be photographed with the power source can be increased.

The following (1) to (5) are preferred embodiments of the present invention. Any combination of the preferred embodiments (1) to (5) may be considered preferable unless contradiction occurs.

(1) The display unit is a liquid crystal display unit.

When the display unit is the liquid crystal display unit, the displaying on the liquid crystal display unit is appropriately controlled depending upon the kind of the power source during charging the capacitor. Consequently, the usability-excellent image-recording apparatus is provided, in which inadvertent switching between the displaying and the non-displaying in the liquid crystal display unit can be prevented, and the number of images to be photographed with the power source can be increased.

(2) The power source unit comprises a plurality of terminals to contact the respective plural kinds of the power sources, and the power source detector detects the kind of the power source in use by detecting a voltage of each of the terminals.

By employing the above construction, the kind of the power source can be simply, inexpensively and assuredly detected. Consequently, the usability-excellent image-recording apparatus is provided, in which inadvertent switching between the displaying and the non-displaying in the liquid crystal display unit can be prevented, and the number of images to be photographed with the power source can be increased.

(3) The image-recording apparatus further comprises a setting unit for setting whether the display unit is operated or not during charging the capacitor, and the operation of the display unit is controlled based on the setting with the setting unit.

By employing the above construction, the user can determine by himself or herself whether the convenience on photographing or the number of images to be photographed with the battery is made much of. Thus, the image-recording apparatus having improved usability can be obtained by controlling displaying of the display unit depending upon the use mode of the user.

(4) The setting is effected in the setting unit by making the display unit display a setting screen in which whether the display unit is operated or not during charging the capacitor is to be set and making a selection in said setting screen.

By so constructing, the setting is simply and easily made as to whether the convenience on photographing or the number of images to be photographed with the battery is made much of. Thus, the image-recording apparatus having improved usability is provided.

(5) The image-recording apparatus further comprises a non-volatile memory, information on setting of the operation of the display unit with the setting unit is stored in the non-volatile memory, and the operation of the display unit is controlled based on the information on the setting in the non-volatile memory.

By so constructing, the displaying with the display unit during charging the capacitor can be controlled without setting very turning on/off of the power source. Thus, the image-recording apparatus having better usability is provided.

BRIEF DESCRIPTION OF THE DRAWINGS

For a better understanding of the invention, reference is made to the attached drawings, wherein.

DESCRIPTION OF PREFERRED EMBODIMENTS OF THE INVENTION

In the following, preferred embodiments of the invention will be explained in detail with reference to the attached drawings. The following embodiments have various preferred limitations made technically, but the scope of the invention will not be limited to these embodiments unless it is described that the invention is limited to such limitations.

Embodiment 1

Figure 1:
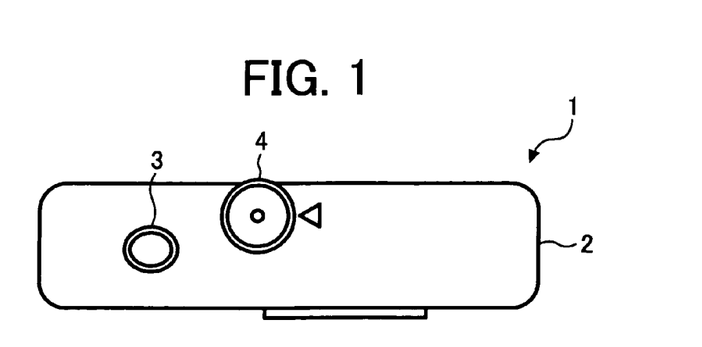
FIG. 1 is a top view of a digital still camera to which an embodiment of the image-recording apparatus according to the present invention is applied.
Figure 2:
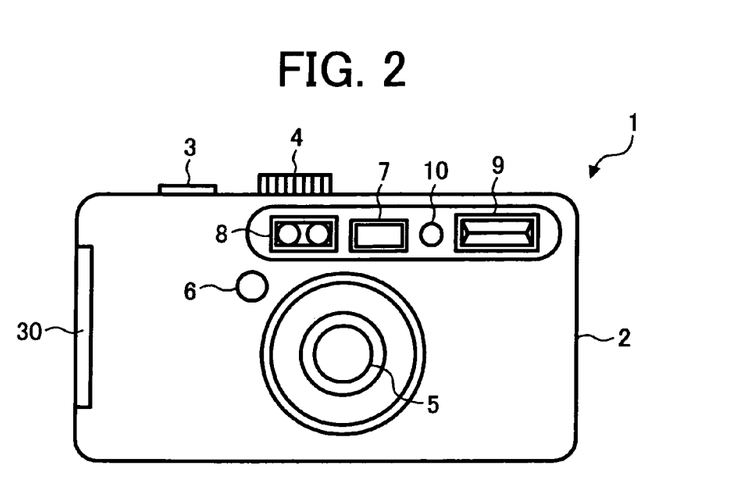
FIG. 2 is a back side view of the digital still camera in FIG. 1.
Figure 3:
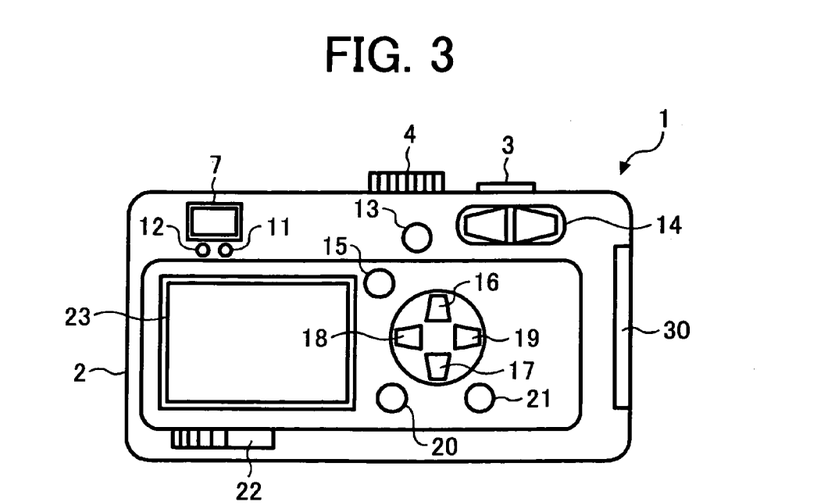
FIG. 3 is a back side view of the digital still camera in FIG. 1.
Figure 4A:
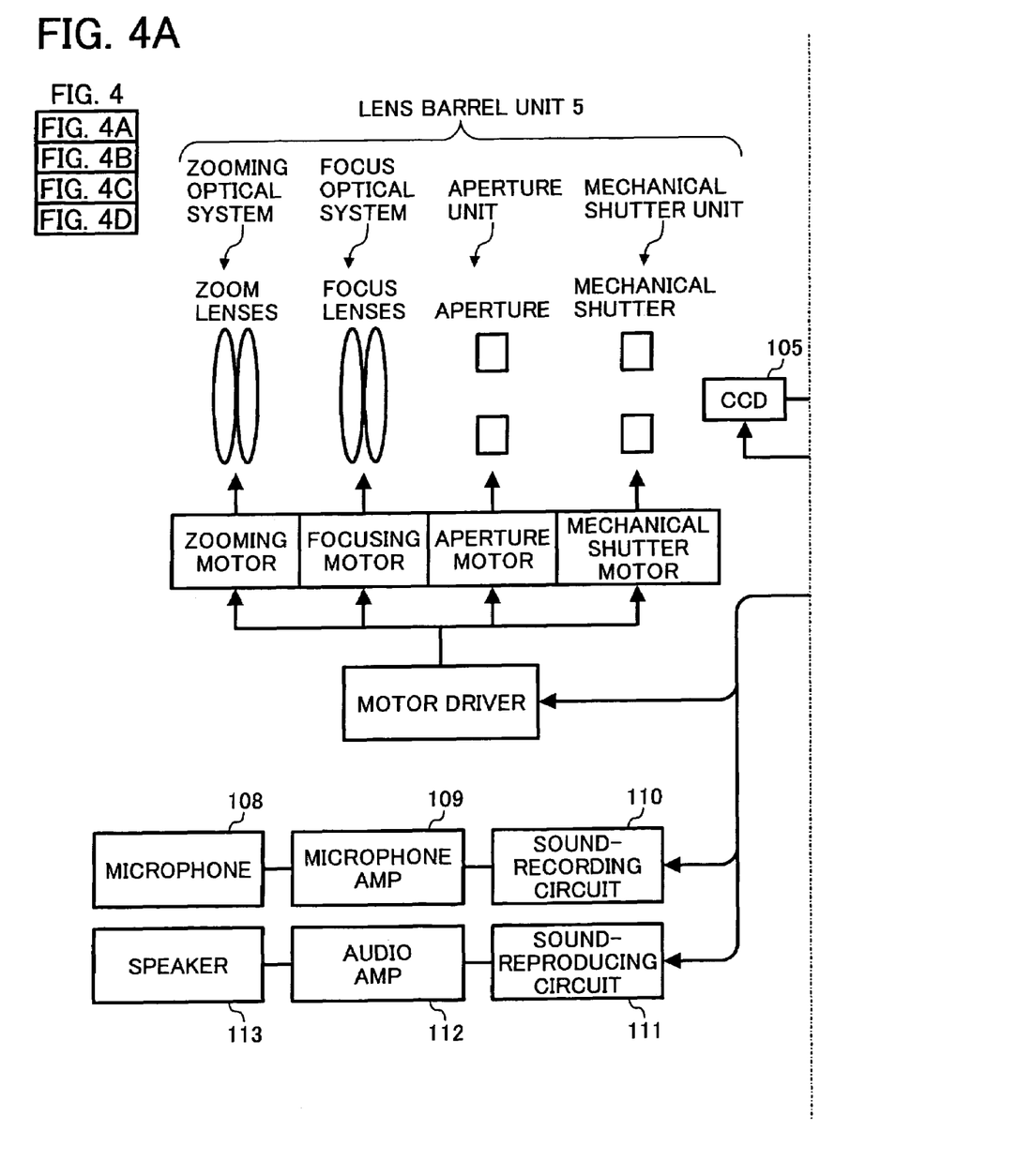
FIG. 4 is a block diagram of the digital still camera in FIG. 1.
Figure 4B:
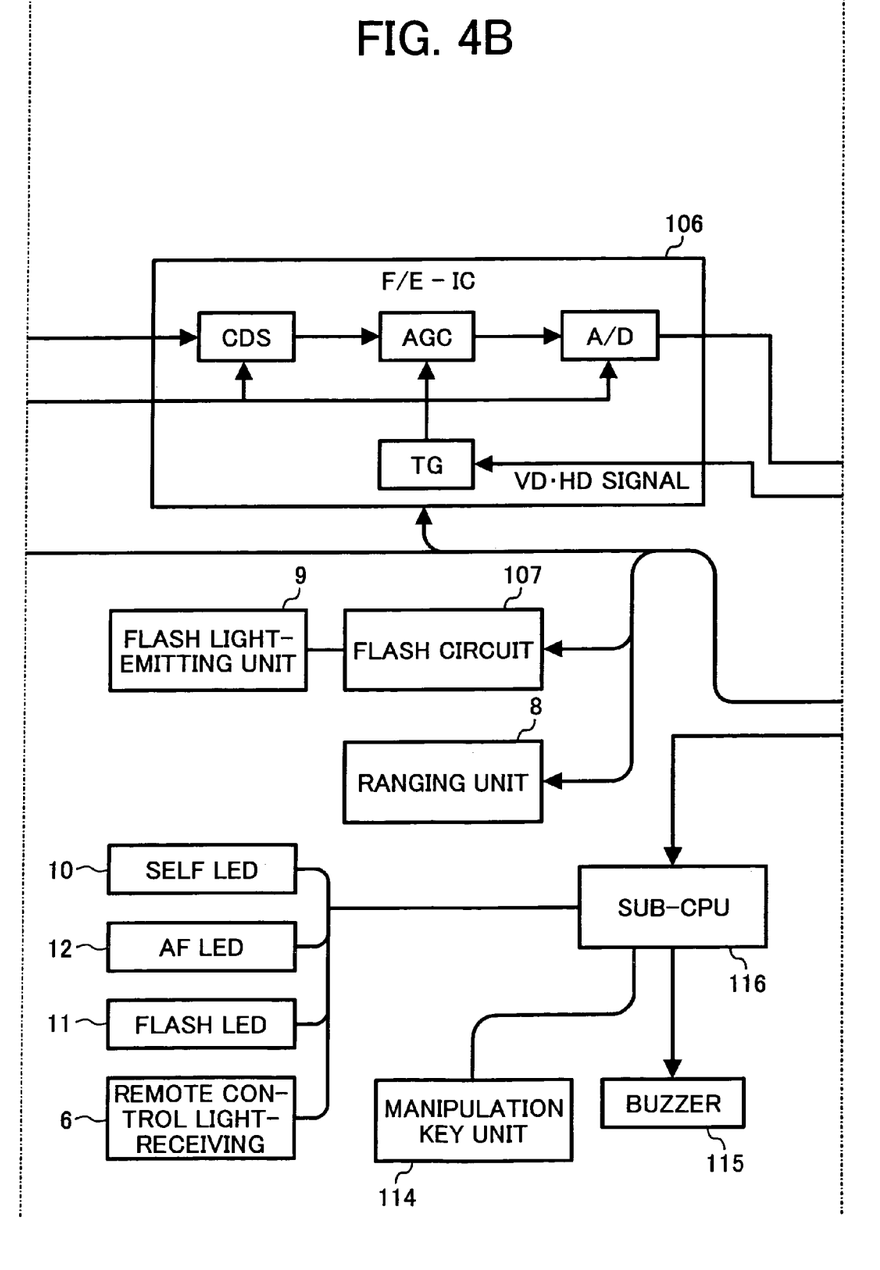
Figure 4C:
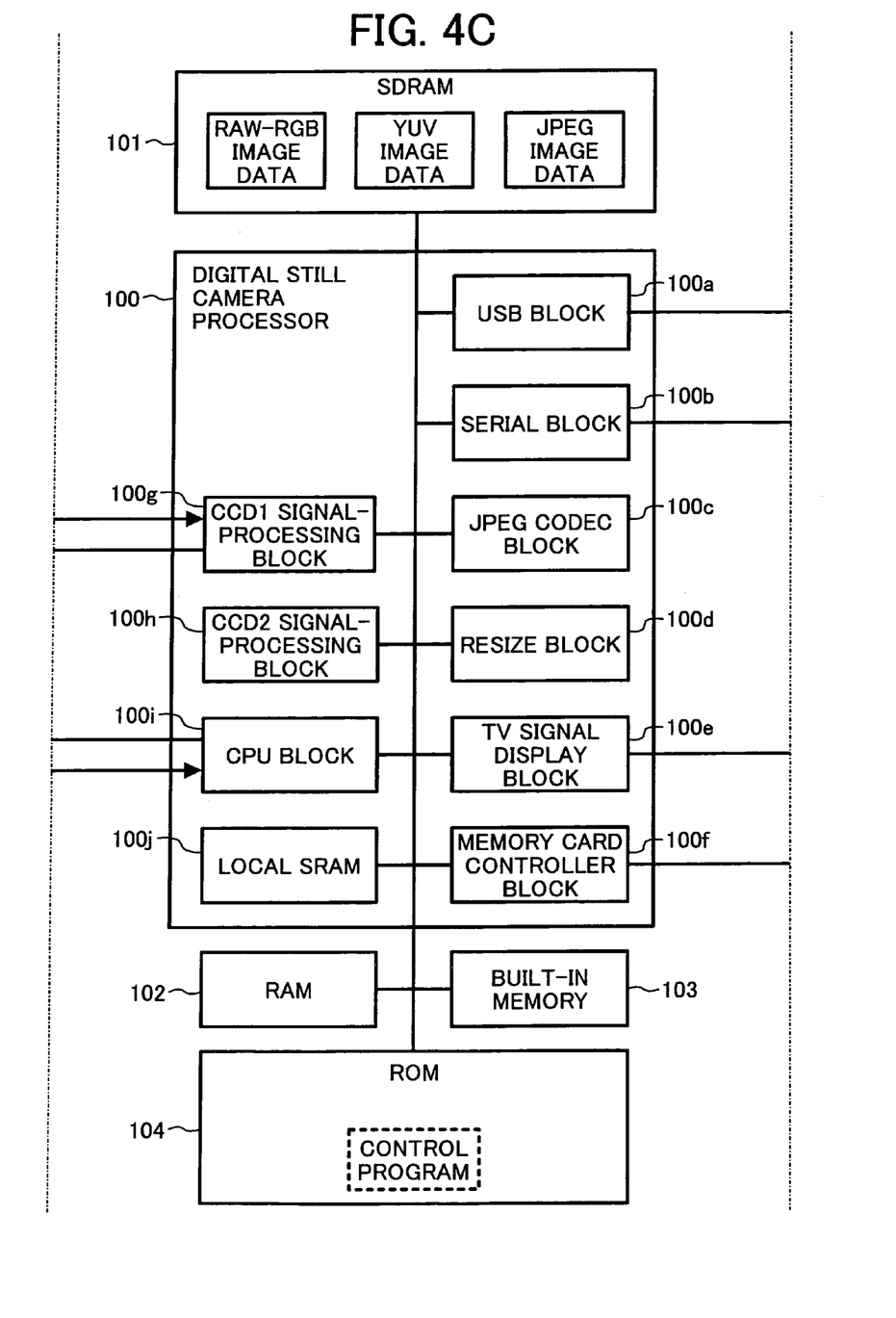
Figure 4D:
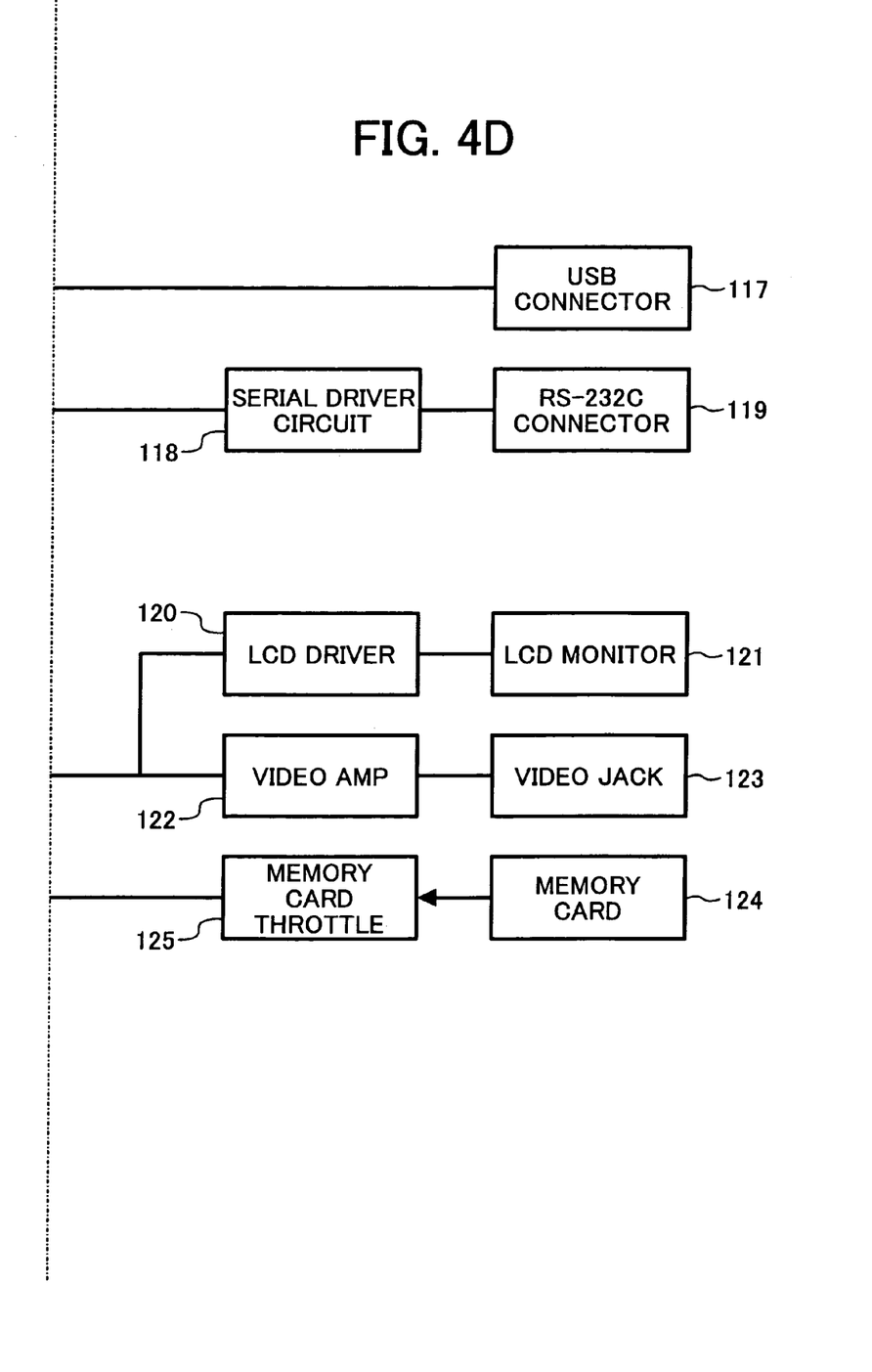

FIG. 1 to FIG. 9 show an embodiment of the image-recording apparatus of the present invention. FIG. 1 is a top view of a digital still camera to which one embodiment of the image-recording apparatus is applied. FIG. 2 and FIG. 3 are a front elevation view and a back side view of the digital still camera in FIG. 1, respectively.

In FIGS. 1 to 3, the digital still camera 1 is equipped with a release button (SW1) 3, a mode dial (SW2) 4, etc. on an upper face of a housing body 2. On a front face of the housing body 2 are provided a lens barrel unit 5, a remote control light-receiving unit 6, an optical finder 7, a ranging unit 8, a flash light-emitting unit (illuminating unit) 9, a self LED 10, etc. On a back face of the housing body 2 are provided:

a flash LED (Light Emitting Diode) 11 arranged under the optical finder 7 for emitting flash light, an AF LED 12 arranged under the optical finder 7 for exhibiting auto focusing motion, a self timer/release switch (SW5) 13, a zooming switch (WIDE/TELE) (SW3/SW4) 14, a menu switch (SW6) 15, an upper/flash switch (SW7) 16, a lower/macro-switch (SW10) 17, a left/image-confirming switch (SW1) 18, a right switch (SW8) 19, an OK switch (SW12) 20,
a display switch (SW9) 21, a power source switch (SW13) 22,
an LCD monitor 23, etc.

A side face of the housing body 2 is provided with an SD card/battery lid 30, etc. The mode switch 4, the upper/flash switch 16, the lower/macro-switch 17, the left/image-confirming switch 18, the right switch 19 and the OK switch 20 totally functions as a setting unit.

The housing body 2 of the digital still camera 1 is formed with a battery chamber not shown, and the above SD card/battery lid 30 closes an outer opening of the battery chamber to prevent a battery placed in the battery chamber from dropping out of the chamber. Plural kinds of batteries such as a size AA battery, a lithium battery, etc. may be selectively placed in the battery chamber. Terminals PT1 to PTn (See FIG. 5) are provided so that any of PT1 to PTn may contact and use the corresponding battery placed in the battery chamber. Although not shown, an SD card chamber is formed adjacent to the battery chamber in the housing body 2 of the digital still camera 1. An SD card (memory card) is to be placed in the SD card chamber. The battery lid 30 is opened or closed, which in turn opens or close the battery chamber and the SD card chamber.

As shown in FIG. 4, the digital still camera 1 has a block diagram having the following construction:
a digital still camera processor 100,
an SDRAM (Synchronous Dynamic Random Access Memory) 101 for storing RAW-RGB image data, YUV image data and JPEG image data,
a RAM (Random Access Memory) 102, a built-in memory 103,
a ROM (Read Only Memory) 104 for storing a control program,
a lens barrel unit 5 including a ZOOM system, a FOCUS system, a throttle unit and a mechanical shutter unit,
a CCD (Charge Coupled Device) 105 provided in the lens barrel unit 5 for photoelectronically converting incident light to image signals and outputting them as image pickup signals,
an F/E-IC (Integrated Circuit) 106 for processing the image pick-up signals from the CCD 105 and outputting the thus obtained signals to the digital still camera processor 100,
a flash circuit 107 for driving the flash light-emitting unit 9 under control of the digital still camera processor 100,
a sound-recording system for recording an external sound obtained by a microphone 108 in a sound-recording circuit
110 under control of the digital still camera processor 100, after amplification of the sound with a microphone amplifier (microphone AMP9) 109,
a sound-reproducing system for outputting a sound from a speaker 113, after reproduction of the sound data recorded in the sound-recording circuit 110 under control of the digital still camera processor 100 in a sound-reproducing circuit 111 and amplification of the reproduced sound in an audio AMP 112,
an SUB-CPU 116 to which are connected the self LED 10, the LED 12, the flash LED 11, the remote control light-receiving unit 6, an operation key unit 114 and a buzzer 115, the operation key unit 114 including the SW1 o the SW13: the release shutter 3 to the power source switch 22,
an USB connector 117, a serial driver circuit 118,
an RS-232C connector 119 connected to the serial driver circuit 118,
an LCD driver 120,
an LCD monitor 121 to be driven by the LCD driver 120,
a vide AMP 122, a video jack 123,
a memory card throttle 125 as the SD card chamber into which a memory card 124 is to be inserted as the SD card, and so on.

The digital still camera processor 100 comprises an USB block 100a connected to the USB connector, a serial block 100b connected to the above serial driver circuit 118, a JPEG CODEC block 100c, a RESIZE block 100d, a TV signal display block 100e connected to the above LCD driver 120 and the video AMP 122, a memory card controller block 100f connected to the above memory card throttle 125, a CCD 1 signal processing block 100g connected to the above F/E-IC 106, a CCD 2 signal processing block 100h, a CPU block 100i connected to the F/E-IC 106, the lens barrel unit 5, the sound-recording system, the sound-reproducing system, the flash circuit 107, CPU block 100i connected to the ranging unit 8, the SUB-CPU 116, etc., a Local SRAM 100j, and so on.

The above SDRAM 101 temporarily stores the image data when the digital still camera processor 100 performs various processings upon the image data. The image data to be stored in the SDRAM 101 are taken in from the CCD 105 via the F/E-IC 106. The image data include "RAW-RGB image data" set as to white balance and gamma by the CCD 1 signal-processing block 100g, "YUV image data" subjected to brightness data/color difference data conversion by the CCD 2 signal-processing block 100h, "JPEG image data" JPEG-compressed by the JPEG CODEC block 100c, etc.

As mentioned above, the memory card throttle 125 is a throttle into which the detachable memory card is fitted. The built-in memory 103 is a memory capable of storing the image data photographed in the state that no memory card is fitted to the memory card throttle 125.

The LCD driver 120 is a drive circuit for driving the LCD monitor 121. The LCD driver 120 also function to convert the video signals outputted from the TV signal display block 100e into signals to be displayed in the LCD monitor 121.

The LCD monitor (display unit, liquid crystal display unit) 121 performs monitoring of the state of an object to be photographed, confirmation of the image immediately after photographing, display of the image data stored in the memory card 124 and the built-in memory 103, etc.

The video AMP 122 is an amplifier to convert the video signals outputted from the TV signal display block 100e into 75 Ω impedance signals, and the video jack 123 is a jack for connection with an external display unit such as a TV.

The USB connector 117 is a connector to be USB-connected with an external device such as a personal computer.

The serial driver circuit 118 is a circuit for converting the voltage of the output signals from the serial block 100b to perform a serial communication with the external device such as the personal computer. RS-232C connector 119 is a connector for serial connection with the external device such as the personal computer.

The SUB-CUP 116, which is a CPU containing a ROM and an RAM in one chip, outputs the output signals from the operation Key unit 114 and the remote control light-receiving unit 6 to the CPU block 100i as operational information for the user. The SUB-CPU 116 also converts the state of the digital still camera 1 outputted from the CPU block 100i to control signals for the self LED 10, the AF LED 12, the flash LED 11 and the buzzer 115, and outputs the control signals thereto.

The self LED 10 displays that the self timer is in operation when the self timer function is performed.

The AF LED 12 is an LED for displaying a focused state on photographing, and the flash LED 11 is an LED for displaying the flash-charged state. The AF LED 12 and the flash LED 11 may be used for displaying other items in accessing to the memory card, etc.

The operation key unit 114 is a Key circuit to be operated by a user. The remote control light-receiving unit 6 receives signals from a remove control transmitter operated by the user.

The microphone 108, the microphone AMP 109 and the sound-recording circuit 110 form a sound-recording unit as a whole. The sound-recording unit amplifies the sound signals collected by the microphone 108 with the microphone AMP 109, and records the amplified sound signals in the sound-recording circuit 110.

The speaker 113, the audio AMP 112 and the sound-reproducing circuit 111 form a sound-reproducing unit as a whole. The sound-reproducing unit 111 converts the sound signals stored in the sound-recording circuit 110 to signals to be outputted through the speaker. The sound signals reproduced by the audio AMP 112 are amplified, and the audio AMP 112 drives the speaker 113 to output the sound signals.

Figure 5:
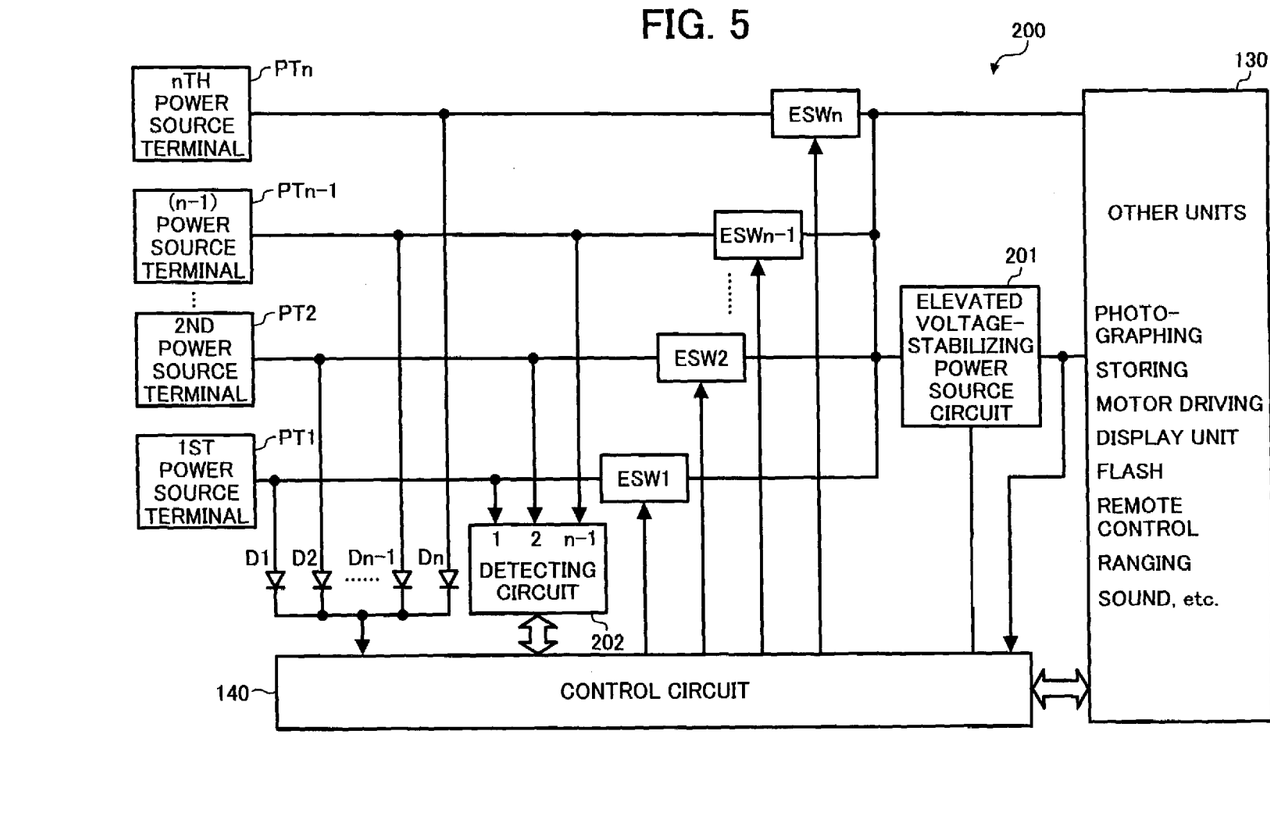
FIG. 5 is an electric source circuit diagram.

As shown in FIG. 5, in the digital still camera 1 thus constructed, the power source circuit (power source unit) 200 provides power source to each of the units 130 of the digital still camera 1. The power circuit 200 is connected to the control circuit 140. As the control circuit 140, the SUB-CPU 116 is used, for example.

As mentioned above, the plural kinds of the batteries may be selectively placed in the battery chamber, and the power source terminals PT1 to PTn are provided for the respective batteries. The first power source terminals PT1 to the nth power source terminals PTn are connected to the respective units 130 directly via switching elements ESW1 to ESWn or further via an elevated voltage-stabilizing power circuit 201, which may be a DC-DC converter. The power source of the voltage elevated by the elevated voltage-stabilizing power circuit 201 is supplied to each of the units 130.

Each of the power source terminals PT1 to PTn is connected to the control circuit 140 via diode D1 to Dn between the terminals and the corresponding switching elements ESW1 to ESWn, respectively. The power source of the fitted battery is supplied to the control circuit 140 from the corresponding one of the power source terminals PT1 to PTn via the corresponding diodes D1 to Dn.

A detecting circuit 202 is connected between the power source terminals PT1 to PTn-1 and the corresponding switching elements ESW1 to ESWn-1, respective. The detecting circuit (power source detector) 202 detects which one of the power source terminals PT1 to PTn-1 is connected to the battery, that is, which kind of the battery is placed in the battery chamber. The detector outputs the detection result to the control circuit 140.

In the illustrated embodiment, only the power source terminals PT1 to PTn-1 are connected to the detecting circuit t202 in the power source circuit 200, although the power source terminal PTn is not connected. This is because it can be judged that the battery connecting to the power source terminal PTn is placed in the battery chamber if the detecting circuit 202 does not detect that the power source is connected to any of the power source terminals PT1 to PTn-1 even the power source is supplied to the control circuit 140 via any one of the diodes D1 to Dn from the battery in the battery chamber. It may be that the nth power source terminal PTn is also connected to the detecting circuit 202, and the detecting circuit 202 DETECTS which one of the batteries connected to the corresponding one of the power source terminals PT1 to PTn is placed in the battery chamber.

The control circuit 140 judges based on the detection result of the detecting circuit 202 which battery connected to any one of the power source terminals PT1 to PTn is placed in the battery chamber, and turns on the corresponding one of the switching elements ESW1 to ESWn that is connected to the corresponding one of the terminals PT1 to PTn contacting the battery.

The elevated voltage-stabilizing power circuit 201 elevates the voltage of the power source of the battery supplied via one of the power source terminals PT1 to PTn, stabilizes the voltage and supplies the stabilized voltage VCC to the control circuit 140.

Figure 6:
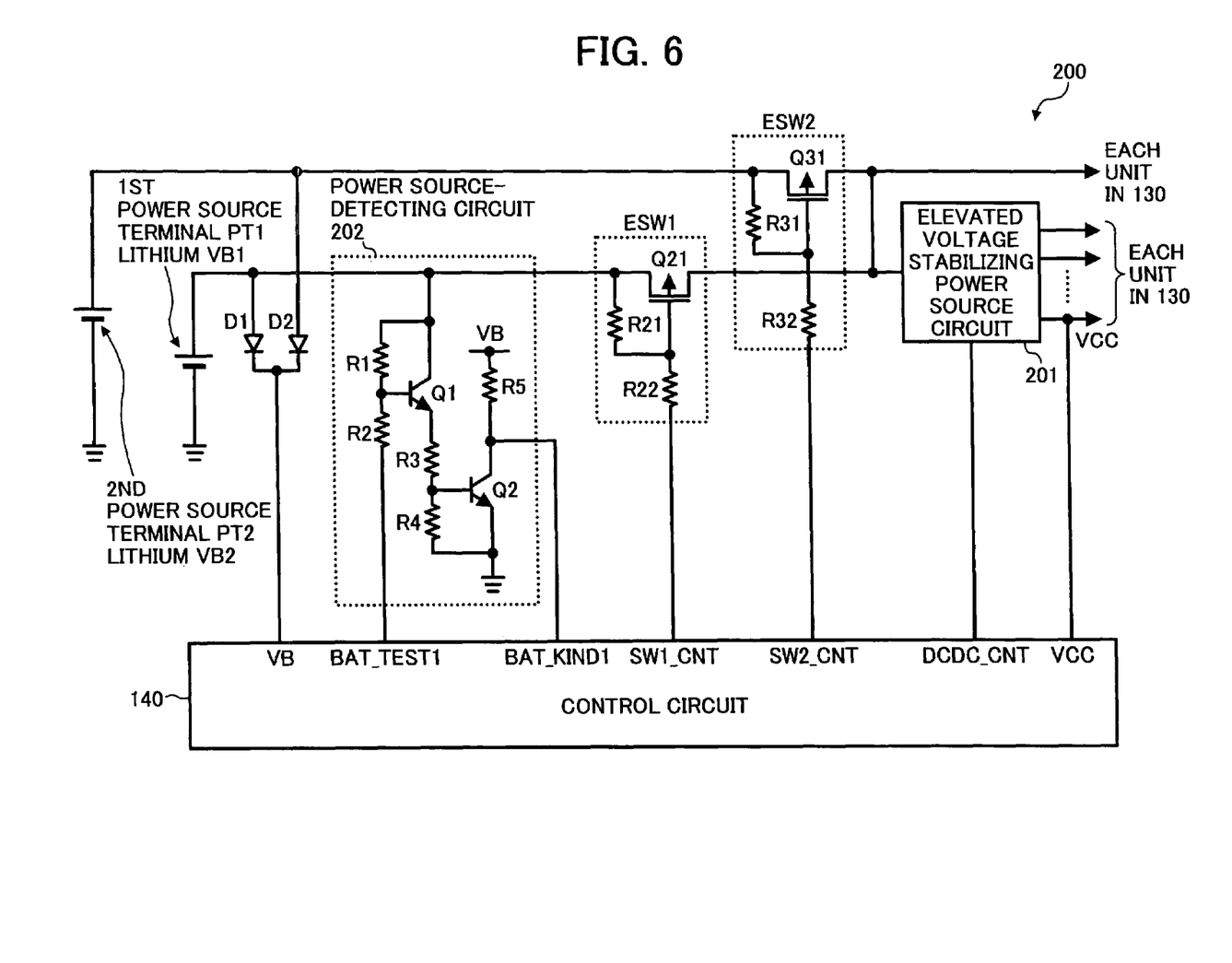
FIG. 6 is an electric source circuit diagram using a size AA battery and a lithium battery as a battery for a power source circuit.

Then, when two kinds of the batteries: the size AA battery and the lithium battery can be selectively stored in the battery chamber as the power source in the digital still camera 1, the terminal arrangement is made as shown in FIG. 6 such that the battery circuit 200 selectively connects the size AA battery and the lithium battery to the first and second power source terminals PT1 and PT2, respectively.

Each of the PT1 and PT2 supplies the power sources of the battery to the control circuit 140 via the diode D1 or D2. The power detecting circuit 202 detects whether the battery is connected to the first power source terminal PT1 or not. The power source detecting circuit 202 is constituted by two transistors Q1 and Q2 and five resistors R1 to R5, for example. As shown in FIG. 6, for example, an emitter of the transistor Q1 is connected directly to the first power source terminal PT1, whereas its base is connected to the terminal PT1 via the resistor R1. The base of the transistor Q1 is also connected to a BAT_TEST 1 terminal of the control circuit 140 via the resistor R2. A collector of the transistor Q1 is connected to a base of the transistor Q2 via the resistor R3. A base of the transistor Q2 is connected via the resistor R4 to an emitter grounded. The battery voltage VB supplied from the first power source terminal PT1 or the second power source terminal PT2 via the diode D1 or the diode D2 is supplied to a collector of the transistor Q2 via the resistor R5. The collector of the transistor Q2 is connected to a BAT_KIND 1 terminal of the control circuit 140.

When the size AA battery or the lithium battery is fitted to the battery chamber, the power source is supplied to the control circuit 140 from the first power source terminal PT1 or the second power source terminal PT2 via the diode D1 or the diode D2, so that the microcomputer constituting the control circuit 140 is subjected to "power-on-reset", thereby starting the programmed operation. The control circuit 140 waits for a predetermined time period, and detects the power source after lapse of this predetermined time period. This waiting time period is a waiting time required for stabilizing the voltage of the power source and stabilizing the amplitude and the frequency of an oscillating circuit (not shown) to form a standard clock as a standard for microcomputer of the control circuit 140.

The control circuit 140 puts the BAT_TEST 1 terminal to an L level so as to detect the power source. The base of the transistor Q1 has a high impedance until the BAT_TEST 1 terminal reaches the L level.

When the size AA battery is fitted into the battery chamber and the voltage of the power source is fed into the emitter of the transistor Q1 from the first power source terminal PT1, the transistor Q1 is turned on, the transistor Q2 is then turned on, and the BAT_KIND 1 terminal of the control circuit 140 is set to the L level. When the lithium battery is fitted into the battery chamber, the transistor Q1 is not turned on and the transistor Q2 is not turned on, either even if the control circuit 140 sets the BAT_TEST 1 terminal to the L level. Thus, the BAT_KIND 1 terminal of the control circuit 140 is set at the high (H) level. That is, it is judged that in case the BAT/TEST 1 terminal is set at the L level, the size AA battery is fitted into the battery chamber when the BAT_KIND 1 terminal is at the L level, whereas the lithium battery is fitted into the battery chamber when the BAT_KIND 1 terminal is at the H level.

As shown in FIG. 6, the above switching element ESW1 includes a switching transistor Q21 as an FET, and two resistors R21 and R22, whereas the switching element ESW2 includes a switching transistor Q31 as an FET, and two resistors R31 and R32. When the battery is connected to PT1 or PT2, the switching transistor Q21 or Q31 is turned on if the SW1_CNT or the SW2_CNT of the control circuit 140 to which the gate of the switching transistor Q21 or Q31 via the resistor R22 or R32 is connected is at the L level. Thus, the power source terminal PT1 or PT2 is connected to the unit 130 and the elevated voltage-stabilizing power source circuit 201.

If the control circuit 140 judges that the size AA battery is fitted into the battery chamber, it sets the SW1_CNT terminal at the L level to turn on the switching element ESW1. On the other hand, if the control circuit 140 judges that the lithium battery is fitted into the battery chamber, it sets the SW2_CNT terminal at the L level to turn on the switching element ESW2.

Next, the function of the present embodiment will be explained. The photographing operation of the digital still camera 1 will be first explained based on FIG. 7.

In the digital still camera 1, the release shutter (SW1) 3 is a two-stage mechanical switch. A signal at the first stage (half pushed state) and that at the second stage (fully pushed state) are taken as RL1 and RL2, respectively. When the digital still camera 1 is in the half-pushing-waiting state (RL1-waiting), an object to be photographed is displayed in the LCD monitor 23 (hereinafter this state being referred to as "monitoring"). The user decides a composition while watching the image, and half pushes the release shutter 3 to generate a RL1 signal.

Figure 7:
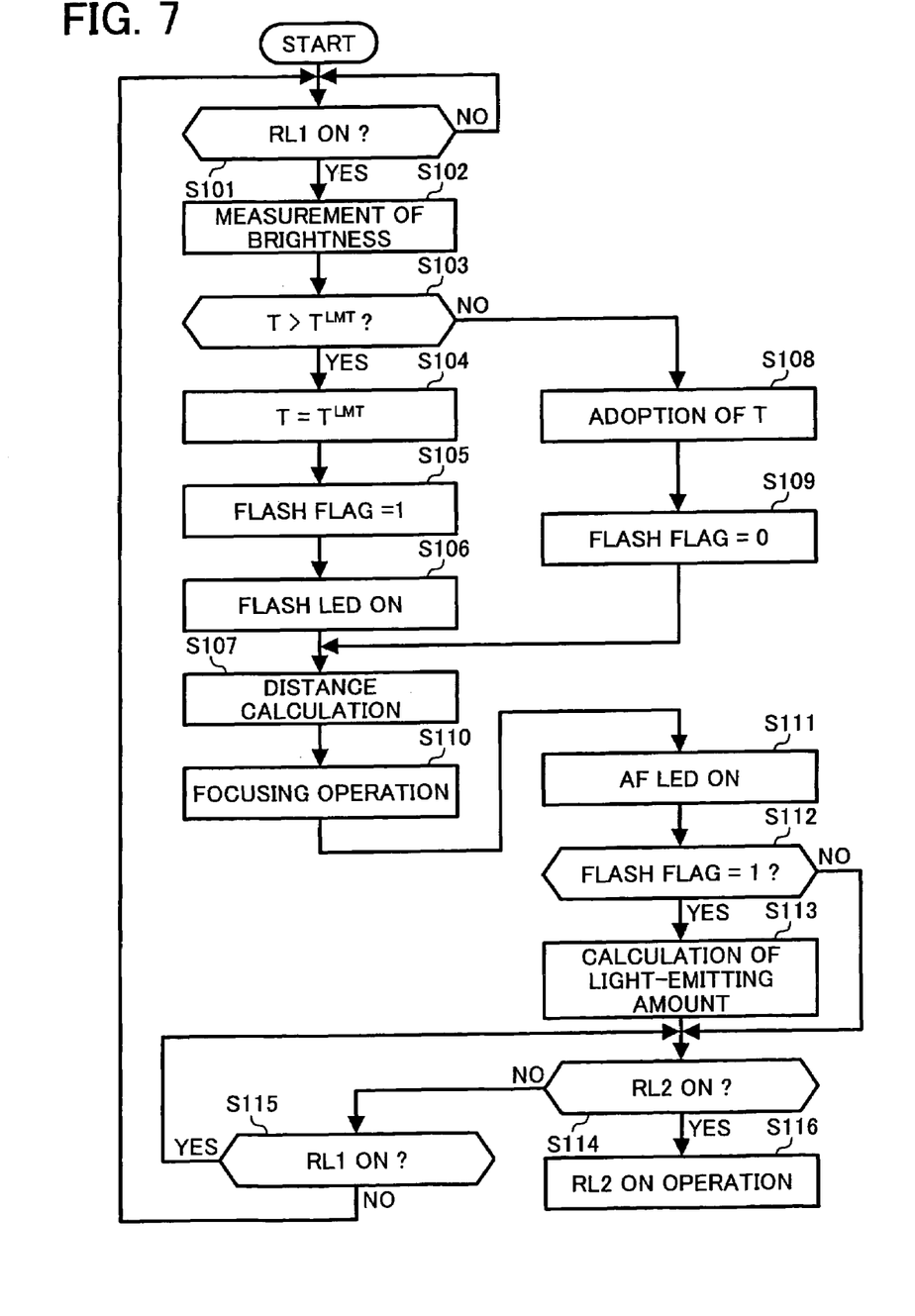
FIG. 7 is a flow chart showing a photographing operation with the digital still camera in FIG. 1.

As shown in FIG. 7, the digital still camera 1 checks whether the RL1 signal is turned on by half pressing the release shutter 3 or not (Step S101). When the RL1 signal is turned on, the brightness of the object is measured based on an output signal from the sensing device (CCD) 105 (Step S103). When the brightness of the object is measured, the digital still camera 1 calculates a shutter second time period T, which gives an appropriate exposure, based on the information of the measured brightness of the object, the F-number of the photographing lenses and ISO sensitivity of the CCD (sensing device) 105 (Step S102). It is checked whether the calculated shutter second time period T is longer than a image-stabilizing limit second time period TLMT or not (Step S103). If the calculated shutter second time period T is longer than the image-stabilizing limit second time period TLMT, the calculated shutter second time period T is replaced by the image-stabilizing limit time period TLMT, which is stored in the RAM 102 or the Local SRAM 100j as a temporary memory (Step S104).

When the digital still camera 1 replaced the calculated shutter second time period T by the image-stabilizing limit time period TLMT, the camera sets, at RAM 102 or the Local SRAM 100j, a flag (flash flag)=1 meaning that the flash is to be used on actual photographing after the release shutter 3 is fully pushed to turn on the RL2 signal (Step S105), because the exposure becomes insufficient without flashing. The flash LED 11 is lit via the SUB-CPU 116 (Step S106), and the distance up to the object is measured (ranged) (Step S107).

On the other hand, if the calculated shutter second time period T is not longer than the camera shake limit time period TLMT, which is an allowable maximum limit time causing no effect upon the image through the camera shaking, the digital still camera 1 employs the shutter second time period T (Step S108) stores in the RAM 102 or the Local SRAM 100j a flag (flash flag)=0 meaning that no flash is to be used on actual photographing (Step S109), and the distance up to the object is measured (ranged) (Step S107).

The digital still camera 1 in this embodiment can measure the distance with both the ranging unit 8 and the CCD 115 as the sensing device. Thus, the distance measurement can be performed selectively by utilizing the characteristics of the ranging unit 8 or the CCD.

When the distance is measured, the digital still camera 1 calculates a moving amount of the focus lens based on the information of the measured distance, and performs the focusing motion (Step S110). The SUB-CPU 116 puts on the AF LED 12 (Step S111), and checks if the flash flag is set at "1" (Step S112).

When the flash flag is set at "1" in Step S112, the digital still camera 1 calculates a light-emitting amount of the flash from the distance information, the F-number of the photographing lenses and the ISO sensitivity of the CCD 105 as the sensing device. Then, the camera stores the calculated light-emitting amount in the RAM 102 or the Local SRAM 100j (Step S113), and checks if the RL2 signal is turned on (Step S114). If the flash flag is "0" in Step 112, no flash needs to be lit. Thus, it is checked whether the RL2 signal is turned on or not without calculating the light-emitting amount of the flash (Step S114).

If in Step S114, the release shutter is not fully pressed and the RL2 signal is not turned on, the digital still camera 1 checks if the release shutter 3 is maintained half pressed and the RL1 signal is turned on (Step S115), and then the process is returned to Step S114 where it is checked if the release shutter 3 is fully pressed and the RL2 signal is turned on (Step S14).

If in Step S115, the release shutter 3 is manipulated from the half pressed state and the RL1 signal is turned off, the process is returned to the first state (RL1 signal-waiting state).

If in Step S114, the release shutter 3 is operated from the half pressed state to the fully pressed state and the RL2 signal is turned on, the digital still camera 1 performs the RL2 signal turn-on operation (Step S116).

Figure 8:
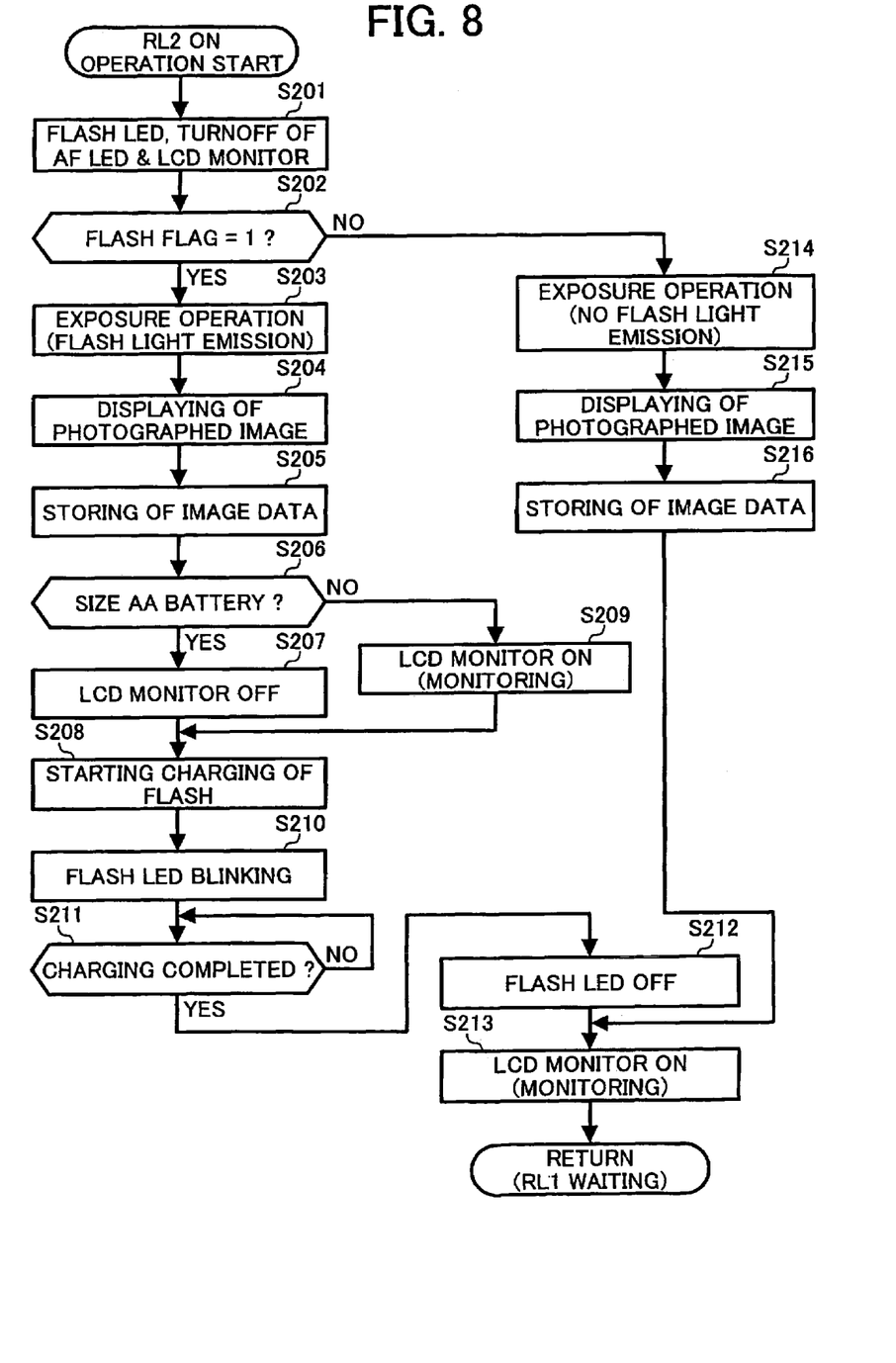
FIG. 8 is a flow chart showing the photographing operation succeeding those of FIG. 7.

When the digital still camera 1 stars the RL2 signal turn-on operation, as shown in FIG. 8, the flash LED 11, the AF LED 12 and the LCD monitor 121 are first turned off (Step S201), and judgment is made on whether lighting is necessary or not on exposure, that is, judgment is made on the flag in the result of the RL1 operation (whether the flash flag is "1" or not) (Step S202).

When the flash flag=1 in Step S202, the digital still camera 1 performs exposure and makes photographing at the light-emitting amount of the flash determined as a result of the operation of the RL1 (Step S203). Then, after the photographed image is displayed in the LCD monitor 121 for a predetermined time period (Step S204), the photographed image is stored in the built-in memory 103 or the memory card 124 (Step S205).

Next, the digital still camera 1 checks through discrimination of the used battery if the size AA battery is used or not (Step S206). When the size AA battery is used, the LCD monitor 121 is turned off (Step S207), and the flash is charged (Step S208). Further, the digital still camera 1 judges in Step S206 that the used battery is the lithium battery, the camera sets the LCD monitor 121 in the monitoring state (Step S209), and starts charging the flash (Step S208).

When the digital still camera starts charging the flash, the SUB-CPU 116 makes the flash LED 11 blink to indicate that the flash is being charged (Step S210), and waiting is performed until the charging of the flash is completed (Step S211).

When the flash is completely charged in Step S211, the digital still camera 1 turns off the flash LED 11 (Step S212), and makes display on the LCD monitor 121, that is, sets it in the monitoring state (Step S213). Then, the process is returned to Step S101 for the RL1 waiting state.

If the flash flag=0 in the above Step S202, the digital still camera 1 takes a photograph under exposure with no light emission of the flash (Step S214). Thereafter, the photographed image is displayed on the LCD monitor 121 for a predetermined time period (Step S215), and then the photographed image is stored in the built-in memory 103 or the memory card 124 (Step S216).

After that, the digital still camera 1 is moved to the monitoring state (Step S213), and the process is returned to Step S101 in FIG. 6 for the RL1 signal-waiting state.

Based on the fact as to whether the kind of the power source used in the power source unit where the plural kinds of the power sources can be selectively used is specified as a specific one (for example, the power source having a relatively high electromotive force) or not, the digital still camera 1 controls the displaying on the LCD monitor 121 during when the capacitor for accumulating the charges to light the illuminating unit such as the flash is being charged.

Therefore, the LCD monitor 121 can be prevented from being inadvertently switched between the displaying state and the non-displaying state, and the number of the photographed images per the battery in concern can be increased, thereby enhancing the usability.

The digital still camera 1 in the present embodiment uses the LCD monitor 121 as the display unit.

Therefore, the displaying with the LCD monitor 121 can be appropriately controlled depending upon the kinds of the power sources during charging the capacitor. Thus, the LCD monitor 121 can be prevented from being inadvertently switched between the displaying state and the non-displaying state, and the number of the photographed images per the battery in concern can be increased, thereby enhancing the usability.

Further, according to the digital still camera 1 in this embodiment, there are provided the terminals PT1 to PTn in the power source unit to contact the respective plural kinds of the batteries, and the power detecting circuit 202 determines the kind of the battery by detecting each of the voltages at the respective terminals PT1 to PTn.

Therefore, the kind of the battery can be simply, inexpensively and assuredly detected, so that the LCD monitor 121 can be prevented from being inadvertently switched between the displaying state and the non-displaying state. Consequently, the number of the photographed images per the battery in concern can be increased, inexpensively enhancing the availability.

Explanation has been made only when either one of the size AA battery and the lithium battery is fitted as the power source into the battery chamber, but the power sources are not limited only to the size AA battery and the lithium battery. Various kinds of batteries can be used. Further, as shown in FIG. 9, an AC power source can be used by connecting an AC adaptor, which converts AC voltage to DC voltage, adjusts the voltage and supplies the adjusted voltage.

Figure 9A:
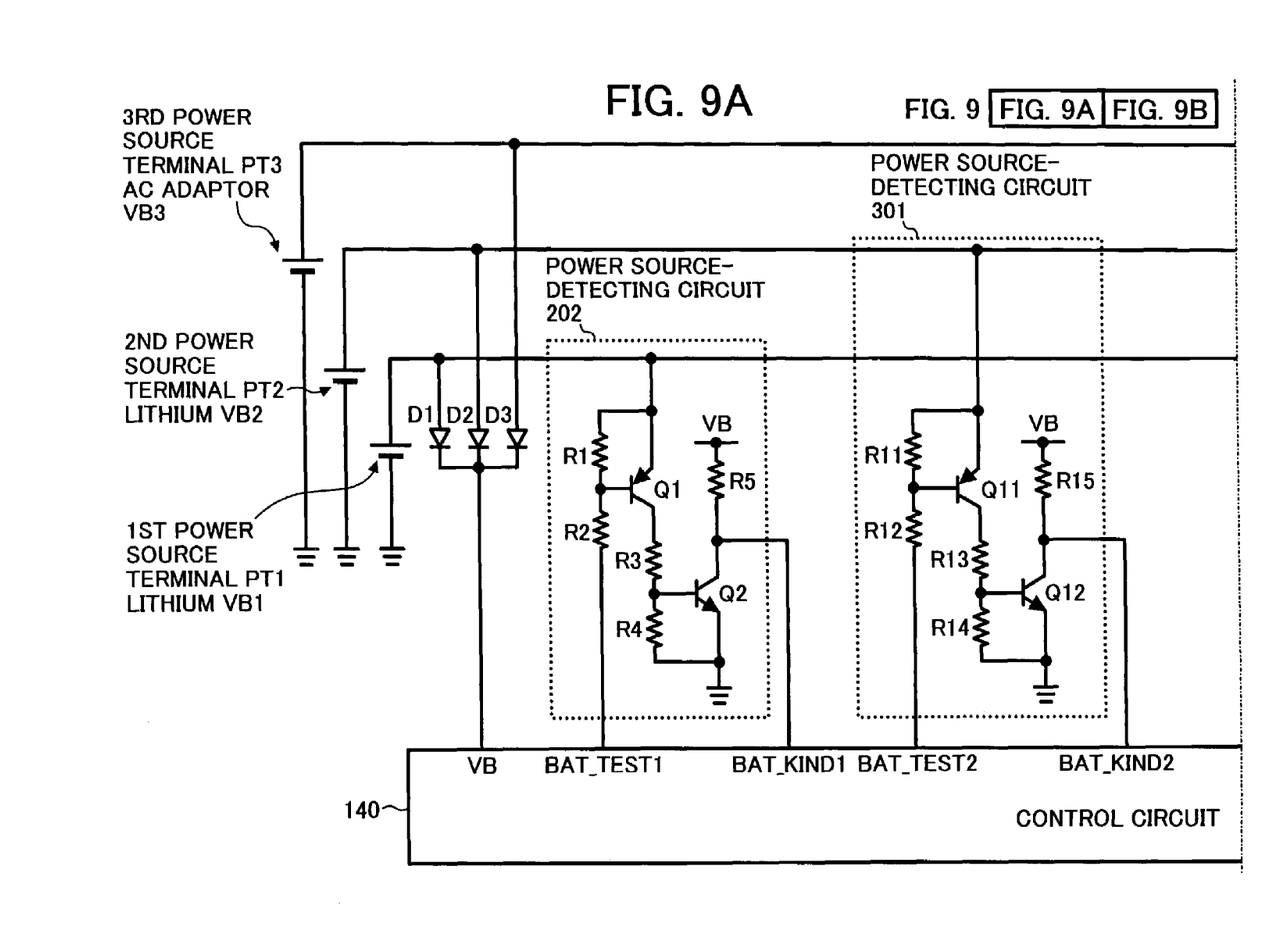
FIG. 9 is an electric source circuit diagram using a size AA battery, a lithium battery and an AC adaptor as a battery for an power source circuit.
Figure 9B:
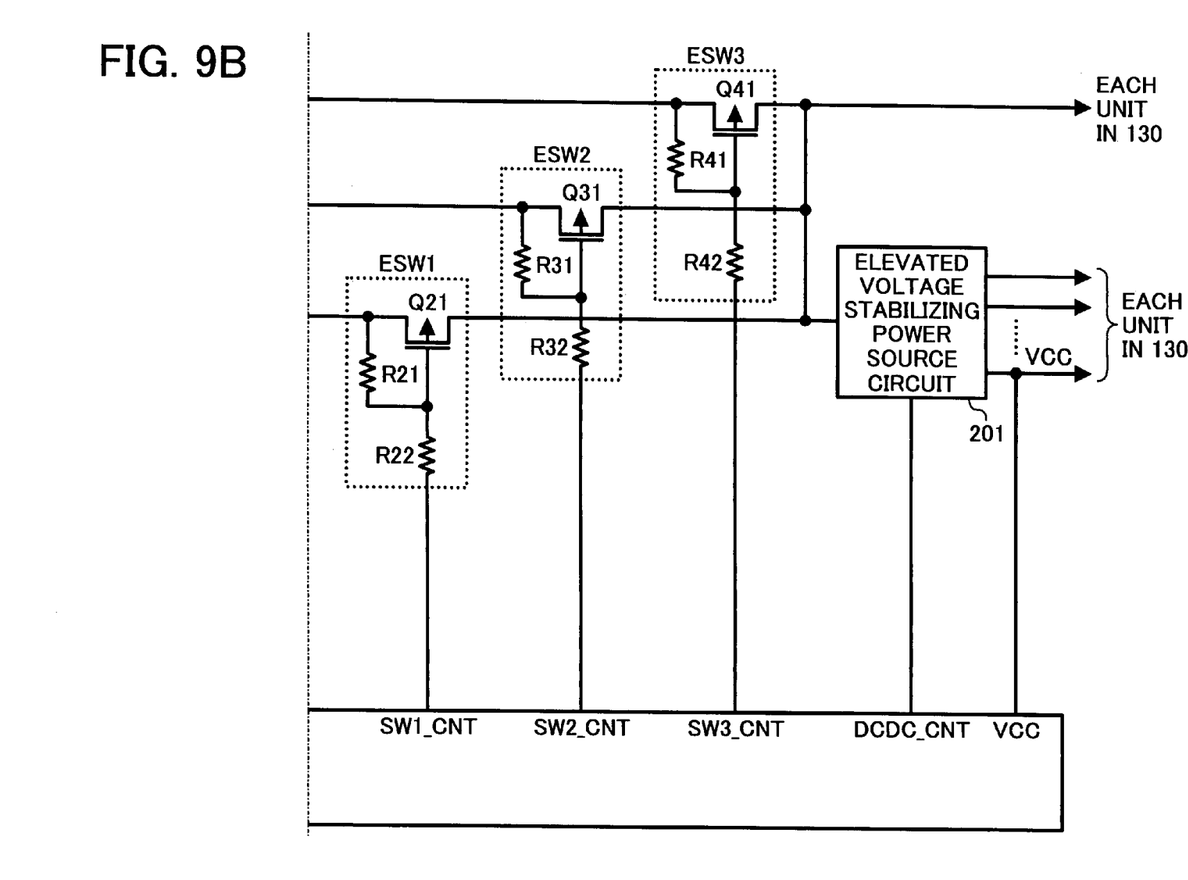

In this case, the digital still camera 1 is provided with a power source circuit 300 as shown in FIG. 9. In FIG. 9, the same and similar constituent parts are denoted by the same reference numerals as in the power source circuit 200 in FIG. 5, and their detailed explanation will be omitted.

As almost same with the power source circuit 200, the power source circuit 300 includes a third power source terminal PT3 to which the AC adaptor is connected, a diode D3, a power source-detecting circuit 301 and a switching element ESW3.

The third power source terminal PT3 is connected to a control circuit 140 via the diode D3 and further to the switching element ESW3.

The power source-detecting circuit 301 is connected to a second power source terminal PT2 to which the lithium battery is to be connected. Like the power source-detecting circuit 202, the power source-detecting circuit 301 comprises two transistors Q11 and Q12 and five resistors R11 to R15, and detects whether the lithium battery is fitted or not, like the power source-detecting circuit 202.

As shown in FIG. 9, the switching ESW3 comprises a switching transistor Q41 such as an FET and two resistors R41 and R42. When the SW3_CNT of the control circuit 140 to which the gate of the switching transistor Q41 is connected via the resistor 42 is set at an L level in the state that the AC adaptor as the power source is connected to the power source terminal PT3, the switching transistor Q41 is turned on, so that the power source terminal PT3 is connected to the unit 130 and the elevated voltage-stabilizing power source circuit 201.

The power source is discriminated by the power source circuit 300 as follows. That is, when the BAT_TEST1 terminal is first set at the L level, the battery is judged as the size AA battery if the BAT_KIND 1 terminal is at the L level, whereas the battery is judged as other battery if the BAT_KIND 1 terminal is at the H level. Successively, when the BAT_TEST2 terminal is set at the L level, the battery is judged as the lithium battery if the BAT_KIND 2 terminal is at the L level, whereas the battery is judged as the AC adaptor if the BAT_KIND2 terminal is at the H level.

When the AC adaptor is provided like this, the digital still camera 1 has the same processings in the photographing sequences except that the power source-detecting way is changed to the above-mentioned power source-judging way from the processings of FIGS. 7 and 8.

When the AC adaptor is provided, as to the processings in FIG. 8, the LCD monitor 121 is turned off on charging the flash in the case of the size AA battery, whereas the flash is charged in the monitoring state when the lithium ion battery or the AC adaptor is used.

It may be that the user sets as to whether displaying is made on the LCD monitor 121 during charging the flash or not, and the displaying on the LCD monitor 121 is controlled based on this setting.

In this case, the display setting during charging the flash may be set for the LCD monitor 121 by key operation according to information on the setting items displayed on the LCD monitor 121. For example, a mode dial (SW2) 4 is a dial for determining a photographing mode or an image-reproducing mode depending upon its positioning. There is a position for a SET UP mode among the modes. In this SET UP mode, various items such as the format of the memory card and the built-in memory, the date, the brightness adjustment of the LCD monitor 121, etc. can be set. Accordingly, the users can customize the digital still camera so that their usability may be enhanced.

More specifically, when the mode dial is set at the SET UP mode, various setting items are displayed on the LCD monitor 121. Various items can be set by manipulating the switches arranged at the back side face of the digital still camera 1 in FIG. 1, such as the mode dial 4, the upper/flash switch 16, the lower/micro-switch 17, the left/image-confirming switch 18, the right switch 19 and the OK switch 20 in combination.

Among the setting items is included a "LCD display control-setting item during charging of the flash", in which the LCD monitor 121 is selectively turned on or off during charging the flash with respect to the batteries to be used. The information of the settings for the respective setting items are stored in a non-volatile memory inside the digital still camera 1.

By this, even when the digital still camera 1 is turned on or off or the battery is exchanged, the setting information is maintained. The displaying on the LCD monitor 121 during charging the flash can be controlled based on the settings thus stored.

Further, "during charging the flash" means that the flash is being charged after the photographing with the light emission of the flash. "Charging" in the digital still camera 1 may include other modes. For example, when the power source switch 22 is turned on, the charged state of the capacitor of the flash and the capacitor is charged depending upon the necessity. The displaying on the LCD monitor 121 is controlled even for such charging.

The present invention made by the inventor has been explained concretely based on the preferred embodiments contrived by the inventors. However, the invention is not limited to these embodiments only. It goes without saying that various changes and modifications can be made within the gist of the invention.

According to the present invention, the displaying on the LCD monitor during charging the flash is controlled depending upon the kinds of the batteries, so that the LCD monitor can be prevented from inadvertently making displaying or no displaying by the capacity of the battery. The present invention can be applied to the image-recording apparatus having a long span life, such as the digital still camera.

What is claimed is:

1. An image-recording apparatus comprising:
    a display unit configured to display an image photographed by a sensing device and subjected to a predetermined signal processing;
    an illuminating unit configured to emit light by discharging charges charged in a capacitor on photographing;
    a power source unit capable of selectively using any one of plural kinds of power sources;
    a power source detector configured to detect which one of the plural kinds of power sources is being used in the power source unit; and
    a control circuit connected to each of the display unit, the illuminating unit, the power source unit, and the power source detector,
    wherein the display unit is configured to display the image and the capacitor is configured to be charged by using the power source in the power source unit, and
    the control circuit is configured to control the display unit so that when the power source detector detects that the power source unit uses a specified one of the power sources, the display unit is operated even during charging the capacitor, whereas when the power source detector detects that a power source other than said specified one is being used in the power source unit, the display unit is set in no operation during charging the capacitor.

2. The image-recording apparatus set forth in claim 1, wherein the display unit is a liquid crystal display unit.

3. The image-recording apparatus set forth in claim 1, wherein the power source unit comprises a plurality of terminals to contact the respective plural kinds of the power sources, and the power source detector detects the kind of the power source in use by detecting a voltage of each of the terminals.

4. The image-recording apparatus set forth in claim 2, wherein the power source unit comprises a plurality of terminals to contact the respective plural kinds of the power sources, and the power source detector detects the kind of the power source in use by detecting a voltage of each of the terminals.

5. The image-recording apparatus set forth in claim 1, which further comprises a setting unit configured to set whether the display unit is operated or not during charging of the capacitor, and the operation of the display unit is controlled based on the setting with the setting unit.

6. The image-recording apparatus set forth in claim 2, which further comprises a setting unit configured to set whether the display unit is operated or not during charging of the capacitor, and the operation of the display unit is controlled based on the setting with the setting unit.

7. The image-recording apparatus set forth in claim 3, which further comprises a setting unit configured to set whether the display unit is operated or not during charging of the capacitor, and the operation of the display unit is controlled based on the setting with the setting unit.

8. The image-recording apparatus set forth in claim 5, wherein the setting is effected in the setting unit by making the display unit display a setting screen in which whether the display unit is operated or not during charging the capacitor is to be set and making a selection in said setting screen.

9. The image-recording apparatus set forth in claim 6, wherein the setting is effected in the setting unit by making the display unit display a setting screen in which whether the display unit is operated or not during charging the capacitor is to be set and making a selection in said setting screen.

10. The image-recording apparatus set forth in claim 7, wherein the setting is effected in the setting unit by making the display unit display a setting screen in which whether the display unit is operated or not during charging the capacitor is to be set and making a selection in said setting screen.

11. The image-recording apparatus set forth in claim 5, which further comprises a non-volatile memory, information on setting of the operation of the display unit with the setting unit is stored in the non-volatile memory, and the operation of the display unit is controlled based on the information on the setting in the non-volatile memory.

12. The image-recording apparatus set forth in claim 6, which further comprises a non-volatile memory, information on setting of the operation of the display unit with the setting unit is stored in the non-volatile memory, and the operation of the display unit is controlled based on the information on the setting in the non-volatile memory.

13. The image-recording apparatus set forth in claim 7, which further comprises a non-volatile memory, information on setting of the operation of the display unit with the setting unit is stored in the non-volatile memory, and the operation of the display unit is controlled based on the information on the setting in the non-volatile memory.

14. The image-recording apparatus set forth in claim 8, which further comprises a non-volatile memory, information on setting of the operation of the display unit with the setting unit is stored in the non-volatile memory, and the operation of the display unit is controlled based on the information on the setting in the non-volatile memory.

15. The image-recording apparatus set forth in claim 9, which further comprises a non-volatile memory, information on setting of the operation of the display unit with the setting unit is stored in the non-volatile memory, and the operation of the display unit is controlled based on the information on the setting in the non-volatile memory.

16. The image-recording apparatus set forth in claim 10, which further comprises a non-volatile memory, information on setting of the operation of the display unit with the setting unit is stored in the non-volatile memory, and the operation of the display unit is controlled based on the information on the setting in the non-volatile memory.

* * * * *